(12) United States Patent
Thiebaut et al.

(10) Patent No.: US 9,408,123 B2
(45) Date of Patent: Aug. 2, 2016

(54) METHOD FOR MOBILITY MANAGEMENT IN A SYSTEM ARCHITECTURE SUPPORTING MOBILITY BETWEEN DIFFERENT ACCESS SYSTEMS

(71) Applicant: Nokia Technologies Oy, Espoo (FI)

(72) Inventors: Laurent Thiebaut, Antony (FR); Alain Bultinck, Longpont sur Orge (FR); Nicolas Drevon, Paris (FR)

(73) Assignee: Nokia Technologies Oy, Espoo (FI)

(*) Notice: Subject to any disclaimer, the term of this patent is extended or adjusted under 35 U.S.C. 154(b) by 112 days.

(21) Appl. No.: 13/675,716

(22) Filed: Nov. 13, 2012

(65) Prior Publication Data
US 2013/0183968 A1 Jul. 18, 2013

Related U.S. Application Data

(63) Continuation of application No. 12/100,835, filed on Apr. 10, 2008, now Pat. No. 8,396,476.

(30) Foreign Application Priority Data

Apr. 12, 2007 (EP) .................................... 07290450

(51) Int. Cl.
*H04W 4/00* (2009.01)
*H04W 36/14* (2009.01)
(Continued)

(52) U.S. Cl.
CPC ............ *H04W 36/14* (2013.01); *H04W 76/046* (2013.01); *H04W 60/04* (2013.01); *H04W 76/06* (2013.01); *H04W 88/06* (2013.01)

(58) Field of Classification Search
CPC ... H04W 36/14; H04W 76/046; H04W 76/06; H04W 88/06; H04W 60/04

USPC .............. 455/422.1, 450–455, 464, 509, 455/436–444, 432.1–434, 435.1–435.3, 455/334, 343.1–343.5, 574; 370/339, 370/341–348, 431–463, 321–337, 310, 311
See application file for complete search history.

(56) References Cited

U.S. PATENT DOCUMENTS 5,943,619 A * 8/1999 Coyne et al. ................... 455/433
6,819,659 B1 11/2004 Palat et al.
(Continued)

FOREIGN PATENT DOCUMENTS

WO WO 2004/002051 12/2003

OTHER PUBLICATIONS

3GPP TR23.882 v 1.9.0 (Mar. 2007) 3rd Generation Partnership Project; Technical Specification Group Services and System Aspects; 3GPP System Architecture Evolution; Report on technical options and Conclusions (Release 7), 3rd Generation Partnership Project (3GPP); Technical Report (TR), Mar. 2007, pp. 1-184, XP002451761.*

(Continued)

*Primary Examiner* — Ronald Eisner
(74) *Attorney, Agent, or Firm* — Harrington & Smith

(57) ABSTRACT

A method for Mobility Management MM in a system architecture supporting mobility between different access systems having separate Core Network CN-level MM entities while using common MM Area, the method comprising a step of: when a User Equipment UE leaves the coverage of a first one of the access systems where it is in a Non Radio Connected state as seen from Radio Access Network RAN, but seen in Connected State from CN-level MM entity, for the coverage of a second one of the access systems where it is in Idle state as seen from CN-level MM entity, putting the UE into Idle state as seen from CN-level MM entity of said first access system.

16 Claims, 3 Drawing Sheets

(51) Int. Cl.
*H04W 76/04* (2009.01)
*H04W 60/04* (2009.01)
*H04W 76/06* (2009.01)
*H04W 88/06* (2009.01)

(56) References Cited

U.S. PATENT DOCUMENTS

| | | | |
|---|---|---|---|
| 7,796,992 B2 | 9/2010 | Lee et al. | |
| 2001/0050907 A1* | 12/2001 | Madour et al. | 370/329 |
| 2002/0111180 A1* | 8/2002 | Hogan | H04W 48/16 455/518 |
| 2005/0153695 A1* | 7/2005 | Cho | 455/436 |
| 2006/0083243 A1 | 4/2006 | Igarashi et al. | |
| 2006/0084417 A1 | 4/2006 | Melpignano et al. | |
| 2006/0234706 A1* | 10/2006 | Wallentin | 455/436 |
| 2007/0263574 A1* | 11/2007 | Lu et al. | 370/338 |
| 2008/0114829 A1* | 5/2008 | Button et al. | 709/203 |

OTHER PUBLICATIONS

3GPP TR 23.882 v 1.9.0 (Mar. 2007) 3$^{rd}$ Generation Partnership Project; Technical Specification Group Services and System Aspects; 3GPP System Architechture Evolution; Report on technical options and Conclusions (Release 7), 3$^{rd}$ Generation Partnership Project (3GPP); Technical Report (TR), Mar. 2007, pp. 1-184, XP002451761.

Motorola: "RS-051093 Intra-technology Mobility—Idle Mode", 3GPP TSG RAN2/3#48BIS, [Online] Oct. 10, 2005, pp. 1-2, XP002451762.

Alcatel-Lucent, On signaling free Mobility with DL UP termination in MME and SGSN, 3GPP TSG SA WG2 Architecture—S2#56 ad hoc Rel-8 S2-071226.

Alcatel-Lucent, Discussion on RAN implications of Equivalent Tracking Areas, 3GPP TSG RAN WG2 #57, R2-070622.

* cited by examiner

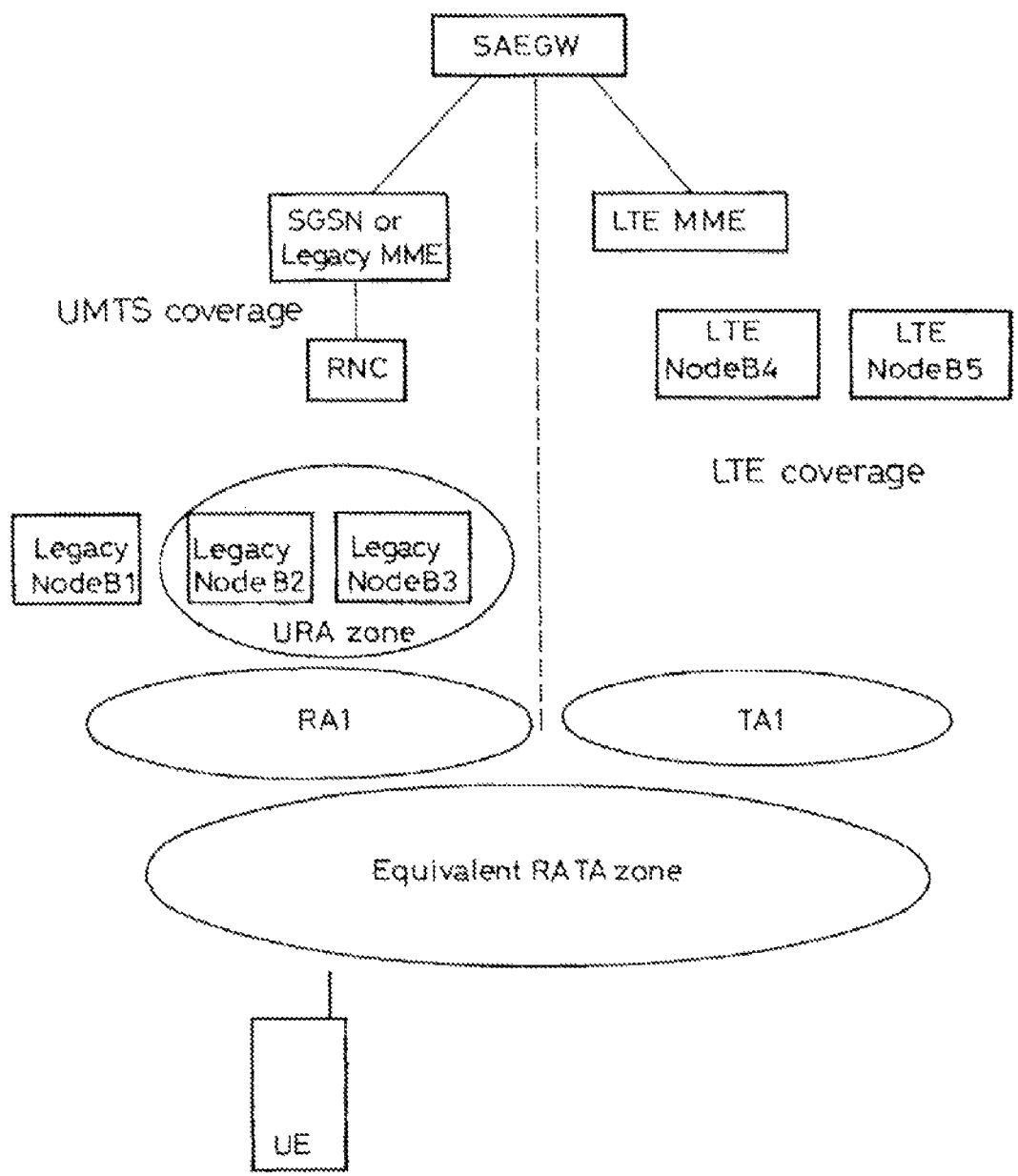
FIG_1
-related art-

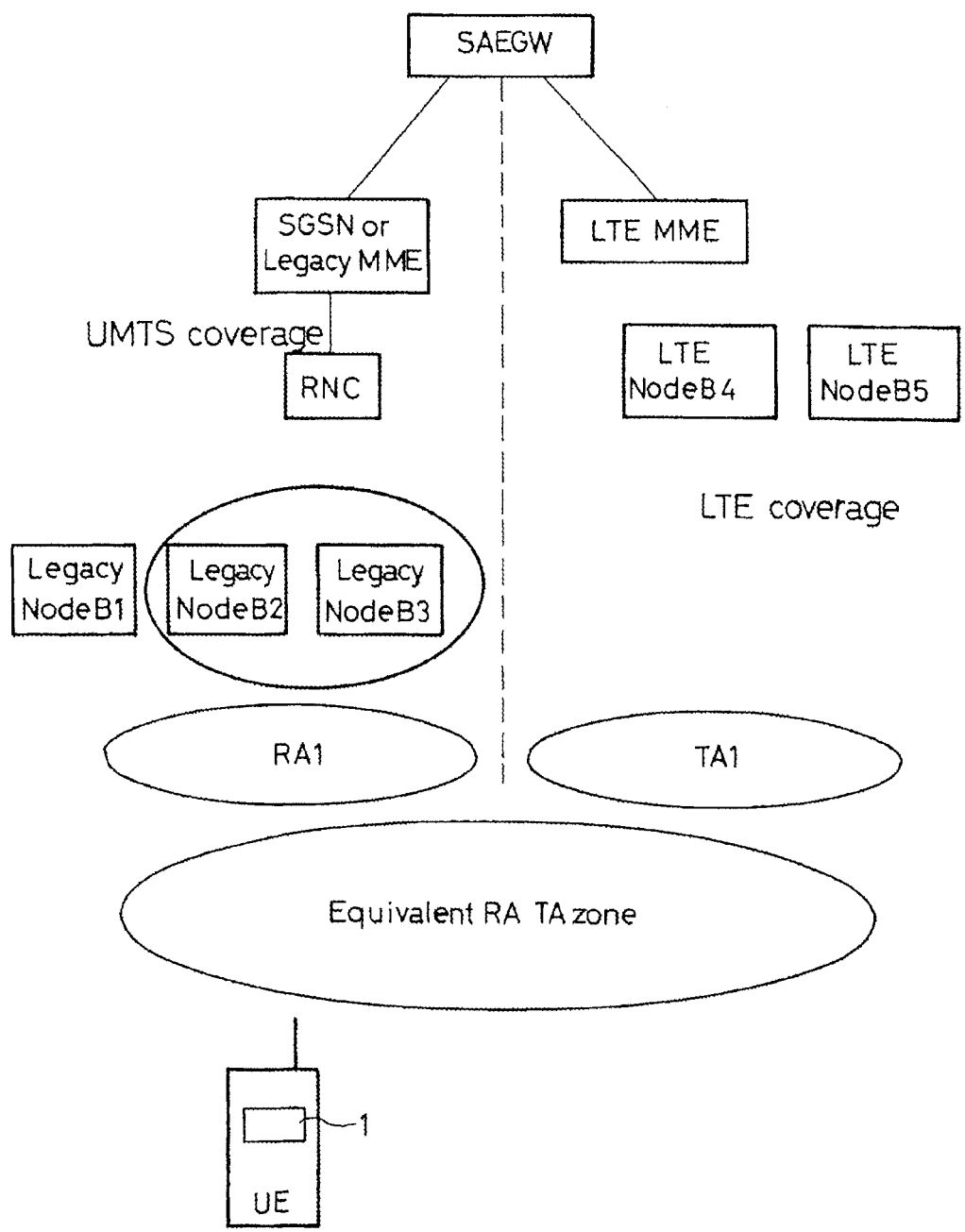

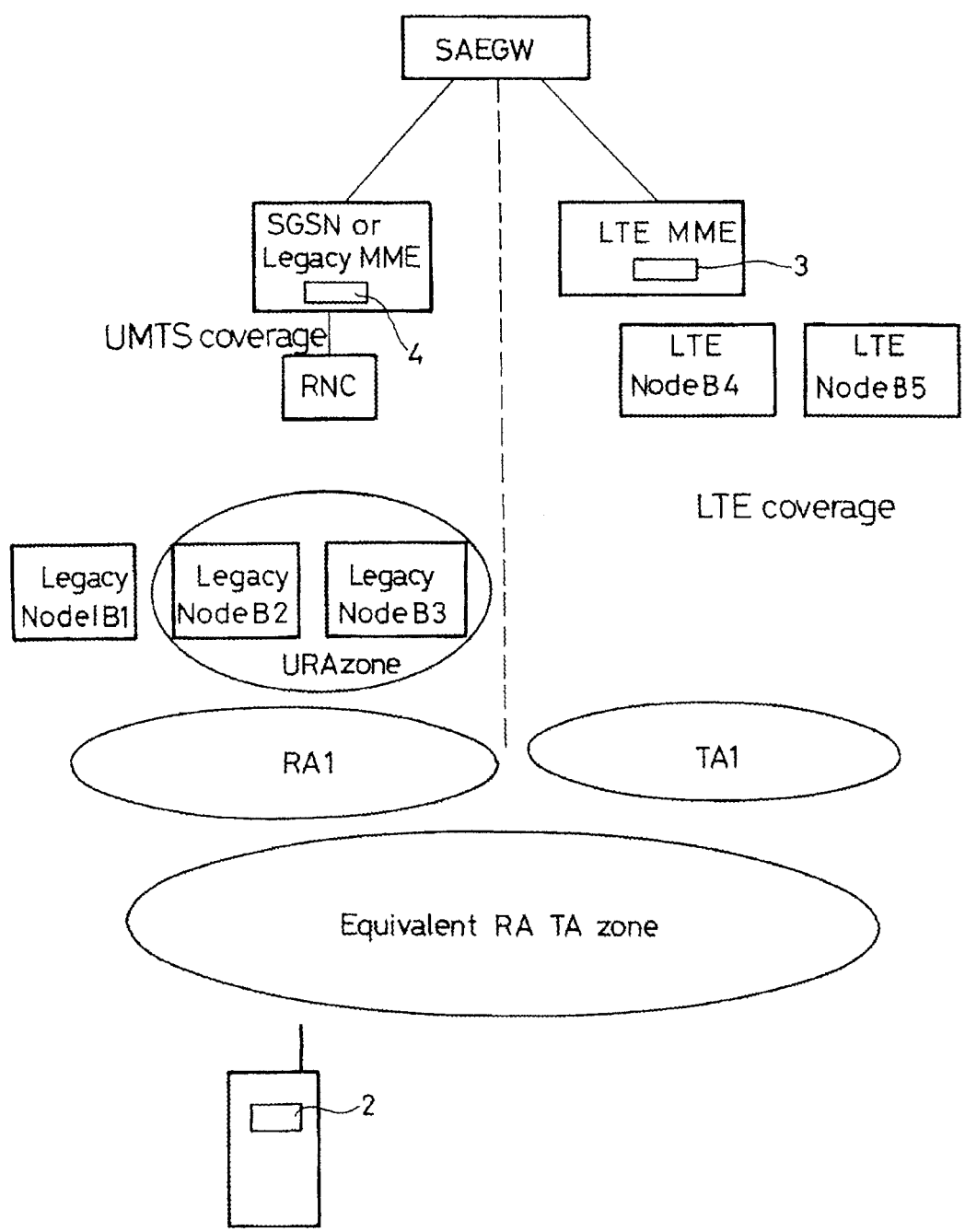

METHOD FOR MOBILITY MANAGEMENT IN A SYSTEM ARCHITECTURE SUPPORTING MOBILITY BETWEEN DIFFERENT ACCESS SYSTEMS

The present application is a continuation and claims priority under 35 USC §120 of U.S. application Ser. No. 12/100,835 filed Apr. 10, 2008, which claims priority on EP 07290450.1, filed Dec. 4, 2007, the entire contents of each of which are hereby incorporated herein by reference.

CROSS-REFERENCE TO RELATED APPLICATIONS

This application is based on European Patent Application No. 07290450.1 filed Apr. 12, 2007, the disclosure of which is hereby incorporated by reference thereto in its entirety, and the priority of which is hereby claimed under 35 U.S.C. §119.

BACKGROUND OF THE INVENTION

1. Field of the Invention

The present invention generally relates to mobile communication systems.

Detailed descriptions of mobile communication systems can be found in the literature, in particular in Technical Specifications published by standardisation bodies such as in particular 3GPP ($3^{rd}$ Generation Partnership Project).

2. Description of the Prior Art

In such systems, a mobile terminal or User Equipment (UE) has access to mobile services offered by a Core Network (CN) via an Access Network (AN), such as in particular a Radio Access Network (RAN).

There are different types of mobile services such as in particular PS-based services (where PS stands for Packet Switched) and IP-based services (where IP stands for Internet Protocol). The Core Network CN therefore comprises different domains and/or subsystems such as in particular PS domain and operator's IP network. In particular UE has access to IP based services offered by an operator's IP network via an Access Network AN comprising: Radio Access Network RAN, and Core Network PS domain providing IP connectivity.

Existing or Legacy systems include in particular 3G ($3^{rd}$ Generation) systems. A typical example is UMTS (Universal Mobile Telecommunications System), including RAN called UTRAN (UMTS Terrestrial Radio Access Network), and GPRS Packet Core Network (where GPRS stands for General Packet Radio Service).

Now there is an evolution towards next generation or evolved systems, having enhanced performances. A typical example is 3G LTE (Long Term Evolution), including RAN called Evolved RAN, and CN called Evolved Packet Core Network.

Mobility Management (MM) is an important issue in such systems. There are different MM functions such as in particular location update functions and paging functions, the aim of such functions being to guarantee that a User Equipment UE can be reached even when there is no active radio connection between the UE and the network.

In Legacy systems as well as in Evolved systems, MM functions are performed at CN level, between UE and a CN-level MM Entity (MME), such as Legacy MME (for example Serving GPRS Support Node SGSN) in 3G Legacy systems, or LTE MME in 3G LTE systems. For PS connections, different MM states have been defined including in particular the following PMM states as defined for Legacy 2.5G GPRS systems for example (where PMM stands for Packet Mobility Management). In PMM Connected state (where a packet signalling connection is established between UE and CN), CN knows the location of the UE with the accuracy of a cell. In PMM Idle state (where no packet signalling connection is established between UE and CN), CN knows the location of the UE with the accuracy of a Routing Area (RA). UE performs a RA update when its RA changes. UE may move from PMM Connected state to PMM Idle state if there is not enough activity on the packet connection. If there is again some activity on the downlink for UE in PMM Idle state, paging of the UE is required to re-activate the packet connection. Paging is performed over the last Routing Area (RA) where the UE is known to be located, i.e. where it is registered.

In 3G Legacy systems such as in particular UMTS, CN is released from some MM functions which can be performed at RAN level, such as in particular at UTRAN level for UMTS (where UTRAN stands for UMTS Terrestrial Radio Access Network). For PS connections, different MM states have been defined including in particular the following states as defined for UTRAN-level MM for example. In a state called hereafter Radio Connected state, where Radio Bearers are established between UE and UTRAN, UTRAN knows the location of the UE with the accuracy of a cell. In a state called hereafter Non Radio Connected URA-PCH state (where URA stands for UTRAN Registration Area and PCH stands for Paging Channel), where no Radio Bearers are established between UE and UTRAN but a signaling connection or Signaling Radio Bearer is established between UE and UTRANUTRAN knows the location of the UE with the accuracy of URA. UE performs URA update when its URA changes. UE may move from a Radio Connected state to Non Radio Connected URAPCH state if there is not enough activity on this connection and user's mobility is such that cell updates would occur too frequently. If there is again some activity on the downlink to UE in URA-PCH state, paging is required to re-establish the radio connection. Paging is performed over the last URA where UE is known to be located, i.e. where it is registered. Non Radio Connected URA-PCH state, as seen from UTRAN, is seen from CN as PMM Connected state. In a mode called RRC Idle mode (where RRC stands for Radio Resource Control), no Radio Bearers and no Signaling Radio Bearers are established between UE and UTRAN. RRC Idle mode as seen from UTRAN is seen form CN as PMM Idle state.

The present invention more particularly relates to MM in a system architecture supporting mobility between various access systems such as in particular Legacy and Evolved access systems, enabling in particular to provide IP-based services through various IP connectivity access networks.

An example of system architecture supporting mobility between LTE and Legacy access systems is illustrated in FIG. 1.

The architecture illustrated in FIG. 1 comprises:
Multimode (Legacy/LTE) User Equipment (UE),
Legacy 3G Radio Access Network, such as for example UTRAN (UMTS Terrestrial Access Network), including Radio Network Controller (RNC) and Legacy Base Stations or Legacy Node B (such as in the illustrated example Legacy NodeB 1, Legacy NodeB 2, Legacy NodeB 3),
LTE Radio Access Network, such as for example E-UT-RAN, including LTE Base Stations or LTE Node B (such as in the illustrated example LTE NodeB 4 and LTE NodeB 5), Legacy Mobility Management Entity (Legacy MME), LTE Mobility Management Entity (LTE MME),
a Gateway SAEGW providing interconnection between access system (Legacy and/or LTE) on one side, and an external IP network, not illustrated, on the other side.

In this example of architecture, there is an as loose as possible coupling within the network infrastructure (both Core Network CN and Radio Access Network RAN) between LTE and Legacy technologies. There are separate radio entities and separate entities handling the Core Network-level mobility. The coupling between Legacy and LTE technology is only provided by:

a signaling communication channel between the LTE-MME entity handling the Core Network level mobility over LTE coverage and the legacy-MME entity handling the Core Network level mobility over legacy coverage Gateway SAEGW.

In Idle mode, Legacy MME (respectively LTE MME) knows the location of the UE with the accuracy of a Routing Area (RA) (respectively Tracking Area (TA)). An UE performs a RA (respectively TA) update when its RA (respectively TA) changes. Paging is performed over the last RA (respectively TA) where the UE has been registered.

The area on which a UE is paged is generally called Paging Area (PA). PA can be a portion of a RA (respectively TA) if sequential paging is used.

In an architecture supporting mobility between LTE and Legacy access systems, such as the one illustrated in FIG. 1 for example, a concept of Equivalent RA(s) or TA(s) (or Equivalent or Common Paging Area) can be used to limit the amount of signalling due to Idle mode mobility (in particular to minimize location update messages towards a subscriber database such as Home Location Register (HLR)). Equivalent Paging Area is made of a set of RA(s) and a set of TA(s). With this concept, an UE is simultaneously attached to each coverage i.e. "attached" (registered) on both legacy-MME and LTE-MME. When UE moves between LTE Idle state, and RRC Idle mode or URA PCH state, UE does no signaling to the network as long as the new cell is within one of the set of Equivalent RA(s) or TA(s). In the example of FIG. 1, TA1 and RA1 are in the same Equivalent Area.

SUMMARY OF THE INVENTION

The present invention recognizes that problems may arise for paging an UE for incoming downlink traffic in an architecture (such as for example the one illustrated in FIG. 1) supporting mobility between Legacy and LTE systems and using the concept of Equivalent or Common MM Area (in particular a Common Paging Area). Such problems can be explained for example as follows.

In an architecture such as the one illustrated in FIG. 1 for example, the UE may be in either of the states illustrated in the table below, on both LTE and Legacy coverage (only significant states are shown in this table):

| Radio State | Radio bearers established* | State as seen from MME (legacy + LTE MME)** | State applies to | Comments |
|---|---|---|---|---|
| Radio Connected | Yes | Connected | LTE/ Legacy | When UE is at state radio Connected on one coverage, it is radio Idle on the other one |
| URA-PCH | No (page) | Connected | 3G Legacy | UE may be URA-PCH (over Legacy 3G) and Idle on LTE coverage. |
| Idle | No (page) | Idle | LTE/ Legacy | UE may be Idle on both coverage |

*when Radio Bearer connection is not established there is a need to page the UE to deliver incoming traffic
**When state seen from MME is Connected, a radio signaling connection is established with the UE.

When the UE is in Radio Connected state on one coverage, there is no problem in preventing the Core Network (SAEGW+MME on the other coverage) from trying to send a packet on the other coverage (preventing from paging on the other radio coverage).

When the UE is in Idle mode on both coverage, there is no problem: paging needs to be sent over both radio coverage.

Problems arise when the UE is in Non Radio Connected state such as URA-PCH over legacy 3G coverage, and in Idle mode on LTE coverage.

In the example illustrated in FIG. 1, there is an URA zone inside RA1 URA. The problem occurs when the UE roams in non active mode between the UMTS URA zone in Routing Area 1 (RA1) and the LTE Tracking Area 1 (TA1). Legacy MME has a bearer connection with the RNC that manages the URA zone (UE state being connected in the Legacy MME) and LTE MME has no bearer connection with any of the LTE NodeBs.

When the UE is in a state such as URA_PCH (aiming at preserving its battery) where Radio Bearers are not established for this UE, there is a need to page the UE in order to (re)-establish the Radio Bearer required to send an incoming packet to the UE over radio.

In general, the paging mechanism must be:

As quick as possible (avoid waiting for a paging failure on one coverage (LTE/Legacy) before initiating the paging on the other coverage (Legacy/LTE))

Efficient, i.e. avoiding to page on both coverage (LTE/Legacy) when it can be a priori known that this is useless.

Also, as a general consideration, while it is possible to modify the Legacy-MME entity due to the introduction of LTE (there are only few Legacy-MME entities deployed in networks and these are provided by a very limited number of manufacturers), modification to Legacy radio entities should be envisaged as a last resort solution (much more nodes and manufacturers would be involved).

A first solution for solving the above-mentioned problems could be as follows.

SAEGW could systematically broadcast Downlink (DL) traffic towards both LTE-MME and Legacy-MME (regardless of user state).

However, when the UE is in Radio Connected state over one coverage (i.e. when there is actual traffic), there are following strong drawbacks that:

traffic is duplicated over the CN (consumes unnecessary bandwidth core on the path towards the coverage where UE is not in Radio Connected state) and useless paging occurs over the coverage where the UE is not in Radio Connected state (and where the mobile is definitively not listening).

As Downlink (DL) traffic is broadcast to both LTE-MME and legacy-MME, also when UE is actually in Radio Connected state, this useless Core Network bandwidth consumption and paging occurs for each user packet which is a waste of resources.

A second solution for solving the above-mentioned problems could be as follows.

Traffic could be sent to only the coverage where from CN (SAEGW), the UE is seen as in Connected mode.

However, a problem is that when the UE is in URA-PCH state, the CN believes the UE is in Connected mode and listening to Legacy coverage, whereas the UE might actually be camping on a LTE cell.

In other words, an UE in URA_PCH state under Legacy 3G coverage may silently move to LTE coverage (if the RA that contains the URA and the TA are equivalent) and hence camp over LTE. The issue stems from the fact that the Core Network (legacy MME+LTE-MME) that is in charge of paging the UE on the whole Equivalent Paging Area believes the mobile is definitively reachable over Legacy coverage whereas UE may be actually camping over LTE coverage.

This means that downlink packet is sent from CN to Legacy radio, that pages the UE (with repetition), needs to wait for some time for an answer from UE that does not answer (as the UE has moved to LTE coverage) and then only warns the Legacy-LTE that the UE is not reachable (putting the UE in Idle mode as seen from legacy-MME). Only then in this alternative would it be attempted to page the UE over LTE coverage. This solution works, does not induce too much useless paging (only for the first packet arriving in this situation) but brings an extra delay for the transfer of this first downlink packet that may prove to be not acceptable, as this first packet is likely to be an invitation for a new call.

A third solution for solving the above-mentioned problems could be as follows.

Legacy Radio Access Network could warn the Core Network when it has put the UE in URA-PCH state, in which situation the CN would attempt the paging over both coverage. This would optimize the paging but requires modifications from legacy RAN, which is not desirable at all.

Therefore, none of the above mentioned solutions is satisfactory, and there is a need to efficiently handle paging for downlink incoming traffic towards a UE being in following combination of states: the UE is in URA-PCH state (over Legacy 3G) and is camping over LTE coverage even though it is in Idle mode. The issue stems from the discrepancy between the mobility state seen by the Core Network (UE is in Radio Connected mode over Legacy radio hence reachable via this radio) and the actual state of the UE (camping over LTE coverage).

The present invention in particular enables to solve part or all of the above-mentioned problems, or to avoid part or all of the above-mentioned drawbacks. More generally, it is an object of the present invention to improve MM in an architecture supporting mobility between various access systems such as in particular Legacy 3G UMTS and Evolved access systems.

These and other objects are achieved, in one aspect of the present invention, by a method for Mobility Management MM in a system architecture supporting mobility between different access systems having separate Core Network CN-level MM entities while using common MM Area, said method comprising a step of:

when a User Equipment UE leaves the coverage of a first one of said access systems where it is in a Non Radio Connected state as seen from Radio Access Network RAN, but seen in Connected State from CN-level MM entity, for the coverage of a second one of said access systems where it is in Idle state as seen from CN-level MM entity, putting the UE into Idle state as seen from CN-level MM entity of said first access system.

In an example, said method comprises:
a step wherein, when the UE leaves the coverage of the first access system, the UE releases its radio signaling connection over said first access system, thus putting the UE into Idle state as seen from CN-level MM entity of the first access system.

In another example, said method comprises:
a step wherein, when the UE leaves the coverage of the first access system, the UE issues a location update towards the CN-level MM entity of the second access system,
a step wherein, based on this location update, the CN-level MM entity of the second access system updates the CN-level MM entity of the first access system, with the mobility state of the UE,
a step wherein, based on this update, the CN-level MM entity of the first access system releases the UE signalling radio connection, thus putting the UE into Idle state as seen from CN-level MM entity of the first access system.

In an example, said first access system corresponds to Legacy 3G system.

In an example, said second access system corresponds to LTE system.

In an example, said Non Radio Connected state corresponds to URA_PCH state.

These and other objects are achieved, in another aspect of the present invention, by a mobile terminal or User Equipment (UE), and by access system entities, for performing a method according to the present invention, in particular entities in charge of Mobility Management MM, such as in particular CN-level Legacy MM Entity (Legacy MME), and CN-level LTE MM Entity (LTE MME).

Another aspect of the present invention is therefore a User Equipment UE, for a system architecture supporting mobility between different access systems having separate Core Network CN-level MM entities while using common MM Area, said UE comprising:
means for, when the UE leaves the coverage of a first one of said access systems where it is in a Non Radio Connected state as seen from Radio Access Network RAN, but seen in Connected State from CN-level MM entity, for the coverage of a second one of said access systems where it is in Idle state as seen from CN-level MM entity, releasing its radio signaling connection over said first access system, thus putting the UE into Idle state as seen from CN-level MM entity of the first access system.

Another aspect of the present invention is therefore a User Equipment UE, for a system architecture supporting mobility between different access systems having separate Core Network CN-level MM entities while using common MM Area, said UE comprising:
means for, when the UE leaves the coverage of a first one of said access systems where it is in a Non Radio Connected state as seen from Radio Access Network RAN, but seen in Connected State from CN-level MM entity, for the coverage of a second one of said access systems where it is in Idle state as seen from CN-level MM entity, issuing a location update towards the CN-level MM entity of the second access system.

Another aspect of the present invention is therefore a Core Network CN-level Mobility Management MM entity of a first access system in a system architecture supporting mobility between different access systems including a first and a second access system having separate Core Network CN-level MM entities while using common MM Area, said entity comprising:

means for releasing a UE signalling connection, based on a mobility state update received from the CN-level MM entity associated with the second access system, in turn based on a location update issued by the UE when the UE leaves the coverage of the first access system where it is in a Non Radio Connected state as seen from Radio Access Network RAN, but seen in Connected State from CN-level MM entity, for the coverage of the second access system where it is in Idle state as seen from CN-level MM entity, thus putting the UE into Idle state as seen from CN-level MM entity of the first access system.

Another aspect of the present invention is therefore a Core Network CN-level Mobility Management MM entity associated with a second access system in a system architecture supporting mobility between different access systems including a first and a second access system having separate Core Network CN-level MM entities while using common MM Area, said entity comprising:

means for updating the CN-level MM entity associated with the first access system, with the mobility state of an UE, based on a location update issued by the UE when the UE leaves the coverage of the first access system where it is in a Non Radio Connected state as seen from Radio Access Network RAN, but seen in Connected State from CN-level MM entity, for the coverage of the second access system where it is in Idle state as seen from CN-level MM entity of the second access system.

BRIEF DESCRIPTION OF THE DRAWINGS

These and other objects of the present invention will become more apparent from the following description taken in conjunction with the accompanying drawings:

FIG. 1 is intended to illustrate an example of system architecture to which the present invention applies, FIG. 2 is intended to illustrate an example of a method according to the present invention, FIG. 3 is intended to illustrate another example of a method according to the present invention.

MORE DETAILED DESCRIPTION OF THE INVENTION

The present invention may also be explained as follows, to simplify based on the example of system architecture illustrated in FIG. 1.

In this example, the present invention recognizes that a way to solve the above mentioned problems, is, when an UE leaves the 3G Legacy coverage where it was in URA-PCH state, to have the URA-PCH state been released over Legacy radio for this UE, thus putting this UE into Idle mode from the CN.

When the UE leaves the 3G Legacy coverage where it was in URA-PCH state to go to LTE coverage, there are two potential situations:

The UE is still able to contact 3G radio: In this case, a solution is that the UE releases the radio signaling connection over 3G before going to LTE, such as illustrated at 1 in FIG. 2, thus aligning the mobility state over radio and over the CN (both being set to Idle)

There is no more adequate 3G radio coverage: in this case, a solution is that the UE issues a Tracking Area Update towards the LTE-MME, such as illustrated at 2 in FIG. 3. Based on this Tracking Area Update, LTE-MME updates legacy-MME with the mobility state of the UE, such as illustrated at 3 in FIG. 3. Receiving a mobility state update from LTE-MME for a UE that it still considers in Connected mode over legacy, the SGSN releases the radio legacy connection for this UE, such as illustrated at 4 in FIG. 3, putting the UE into correct state (Idle) for legacy coverage.

Based on this behavior of the UE, the dual mode (LTE-legacy) UE may only be:

1. In Connected mode over one single coverage over which it is effectively camping.
2. Or in Idle mode over any of both coverage When there is a DL incoming packet:

1. In the former case, the CN can send the packet (and the potential induced paging if the UE is actually in URA-PCH state) over one single radio coverage
2. In the latter case, the CN has to require paging over both coverage.

There is no excessive paging in this case, as paging over double coverage occurs only when the network needs to wake the UE (i.e. for the very first packet to be sent to the UE).

In addition to a method for Mobility Management MM in a system architecture supporting mobility between different access systems (for example a method as disclosed above) the present invention also has for its object entities such as a mobile terminal or User Equipment (UE), and access system entities, for performing a method according to the present invention, in particular entities in charge of Mobility Management MM, such as in particular CN-level Legacy MM Entity (Legacy MME), and CN-level LTE MM Entity (LTE MME).

The detailed implementation of the above-mentioned means does not raise any special problem for a person skilled in the art, and therefore such means do not need to be more fully disclosed than has been made above, by their function, for a person skilled in the art.

The invention claimed is:

1. A multimode User Equipment (UE) comprising:
a transmitter configured to support access to a Universal Mobile Telecommunications System (UMTS) and a Long Term Evolution (LTE) system; and
a processor electrically coupled to the transmitter, the processor configure to, set the UE to a Universal Terrestrial Radio Access Network (UTRAN) Registration Area Paging Channel (URA-PCH) state, and issue, via the transmitter, a Tracking Area Update associated with the UE in the URA-PCH state roaming from the UMTS system to the LTE system, wherein when the UE is set to the URA-PCH state, paging of the UE is required to re-establish a radio connection to the UMTS and the Tracking Area Update enables the LTE system to know the location of the UE.

2. The UE of claim 1, wherein the UE is configured to send the Tracking Area Update to a Mobility Management Entity (MME) associated with the LTE system.

3. The UE of claim 1, wherein the UE is configured to register with the UMTS system and the LTE system.

4. The UE of claim 1, wherein the UE is configured to register with a Mobility Management Entity (MME) associated with the LTE system and a Serving GPRS Support Node (SGSN) of the UMTS system before the UE camping over the LTE system.

5. The UE of claim 1, wherein camping over includes moving a non-active mode from the UMTS system to the LTE system.

6. A Mobility Management Entity (MME) of a Long Term Evolution (LTE) system, the MME comprising:

a receiver; and a processor electrically coupled to the receiver, the processor configured to, receive, via the receiver, a Tracking Area Update based on a multimode User Equipment (UE) set to a Universal Terrestrial Radio Access Network (UTRAN) Registration Area Paging Channel (URA-PCH) state roaming from a Universal Mobile Telecommunications System (UMTS) system to a LTE; and send to a Serving GRPS Support Node (SGSN) of said UMTS system an update based on the received Tracking Area Update, wherein when the UE is set to the URA-PCH state, paging of the UE is required to re-establish a radio connection to the UMTS and the Tracking Area Update enables the LTE system to know the location of the UE.

7. The MME of claim 6, wherein the MME is configured to receive the Tracking Area Update after the UE is registered with the MME and the SGSN.

8. The MME of claim 6, where the update is based on a mobility state of the UE.

9. Serving GPRS Support Node (SGSN) entity for a Universal Mobile Telecommunications System (UMTS), comprising:

A receiver; and

A processor electrically coupled to the receiver, the processor configured to receive, via the receiver, an update based on a Tracking Area Update in response to a multimode User Equipment (UE) set to a Universal Terrestrial Radio Access Network (UTRAN) Registration Area Paging Channel (URA-PCH) state roaming from a UMTS system to a Long Term Evolution (LTE) system, and release a connection to the UE based on the update, wherein when the UE is set to the URA-PCH state, paging of the UE is required to re-establish a radio connection to the UMTS and the Tracking Area Update enables the LTE system to know the location of the UE.

10. The SGSN of claim 9, wherein to release the connection is to place the UE in an Idle state.

11. The SGSN of claim 9, wherein the UE is configured to be registered with the SGSN entity and a Mobility Management Entity (MME) associated with the LTE system before the SGSN is to receive the update.

12. The SGSN of claim 9, where the update is based on the mobility state of the UE.

13. A method for Mobility Management, the method comprising:

setting, by a multimode User Equipment (UE), an operating state for the UE, as a Universal Terrestrial Radio Access Network (UTRAN) Registration Area Paging Channel (URA-PCH) state, the UE configured to support access to a Universal Mobile Telecommunications System (UMTS) and a Long Term Evolution (LTE) system;

generating, by the UE, a Tracking Area Update associated with the UE in the URA-PCH state roaming from the UMTS system to the LTE system; and sending, by the user equipment (UE), the Tracking Area Update to a Mobility Management Entity (MME) of the LTE system, wherein when the UE is set to the URA-PCH state, paging of the UE is required to re-establish a radio connection to the UMTS and the Tracking Area Update enables the LTE system to know the location of the UE.

14. A method for Mobility Management, the method comprising:

receiving at a Mobility Management Entity MME of a Long Term Evolution (LTE) system a Tracking Area Update based on a multimode user equipment (UE) in a Universal Terrestrial Radio Access Network (UTRAN) Registration Area Paging Channel state URA-PCH roaming from a Universal Mobile Telecommunications System (UMTS) system to the LTE system, and sending, by the Mobility Management Entity MME, an update to a Serving GPRS Support Node (SGSN) of said UMTS system based on the received Tracking Area Update, wherein when the UE is set to the URA-PCH state, paging of the UE is required to re-establish a radio connection to the UMTS and the Tracking Area Update enables the LTE system to know the location of the UE.

15. A method for Mobility Management, the method comprising:

receiving at a Serving GPRS Support Node (SGSN) of a Universal Mobile Telecommunications System (UMTS), an update based on a Tracking Area Update issued in response to a multimode User Equipment (UE) in a Universal Terrestrial Radio Access Network (UTRAN) Registration Area Paging Channel state URA-PCH roaming from the UMTS system to a Long Term Evolution (LTE) system; and sending, by the Serving GPRS Support Node (SGSN), a release message based on the update to release a connection of the UE, wherein when the UE is set to the URA-PCH state, paging of the UE is required to re-establish a radio connection to the UMTS and the Tracking Area Update enables the LTE system to know the location of the UE.

16. An Evolved Node B comprising:

a receiver and a transmitter; and a processor electrically coupled to the received and transmitter, the processor configured to, receive, via the receiver, a Tracking Area Update in response to a User Equipment (UE) in a Universal Terrestrial Radio Access Network (UTRAN) Registration Area Paging Channel state URA-PCH roaming from a Universal Mobile Telecommunications System (UMTS) apparatus to a Long Term Evolution (LTE) system apparatus, and send, via the transmitter, said Tracking Area Update to a Mobility Management Entity (MME) associated with the LTE system, wherein when the UE is set to the URA-PCH state, paging of the UE is required to re-establish a radio connection to the UMTS and the Tracking Area Update enables the LTE system to know the location of the UE.

* * * * *